United States Patent [19]

Pish

[11] 3,776,106

[45] Dec. 4, 1973

[54] LINEAR TO ROTARY MOTOR

[76] Inventor: Paul J. Pish, 155 Bedford Rd., Hoffman Estates, Ill. 60172

[22] Filed: Apr. 7, 1972

[21] Appl. No.: 242,078

[52] U.S. Cl. ............................ 92/33, 74/89, 74/99
[51] Int. Cl. ............................................. F01b 3/00
[58] Field of Search ...................... 92/31, 32, 33, 65, 92/76, 116, 234, 235; 74/89 X, 99 X

[56] References Cited
UNITED STATES PATENTS

| | | | |
|---|---|---|---|
| 1,801,633 | 4/1931 | MacKirdy | 92/31 |
| 3,165,982 | 1/1965 | Taylor | 92/33 |
| 3,171,328 | 3/1965 | Hennells | 92/168 X |
| 3,198,539 | 8/1965 | McMullen et al. | 92/31 X |
| 3,264,949 | 8/1966 | Dietlin | 92/31 |
| 3,319,925 | 5/1967 | Koichi Kojima et al. | 92/31 X |
| 3,391,722 | 7/1968 | Ligh | 74/89 X |

Primary Examiner—Martin P. Schwadron
Assistant Examiner—Abe Hershkovitz
Attorney—Howard H. Darbo et al.

[57] ABSTRACT

A rotary apparatus has a variety of applications as, for example, a shock absorbing coupling between driving and driven shafts, an apparatus for converting fluid inputs to the rotation of one or two shafts, an integrator for algebraically adding mechanical input signals and fluid input signals, etc. The apparatus comprises a piston within a fluid cylinder. The piston has two heads spaced apart with a skirt connecting the heads. One rotatable shaft extends through one end of the cylinder and one of the heads. A second rotatable shaft coaxial with the first extends through the other end of the cylinder and the other of the heads. Each shaft is connected by cam followers to cam slots to the piston skirt so that as the piston moves one direction in the cylinder it tends to rotate one shaft in one direction and the other shaft in the opposite direction and vice versa.

19 Claims, 5 Drawing Figures

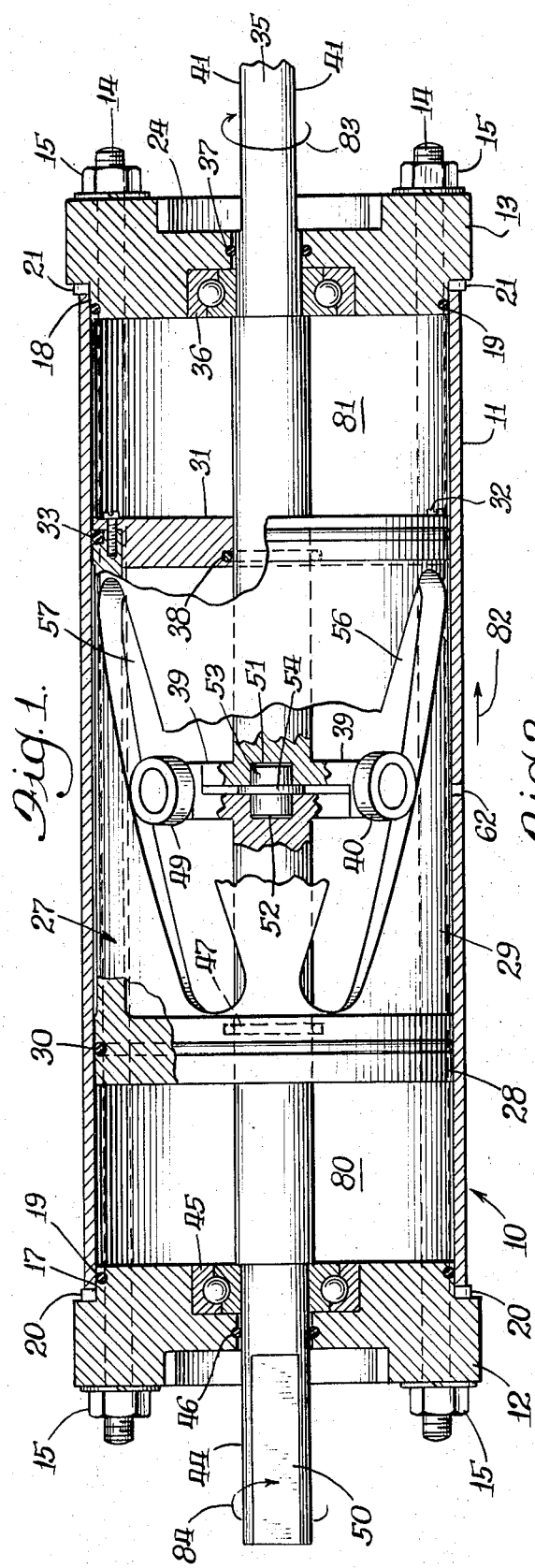
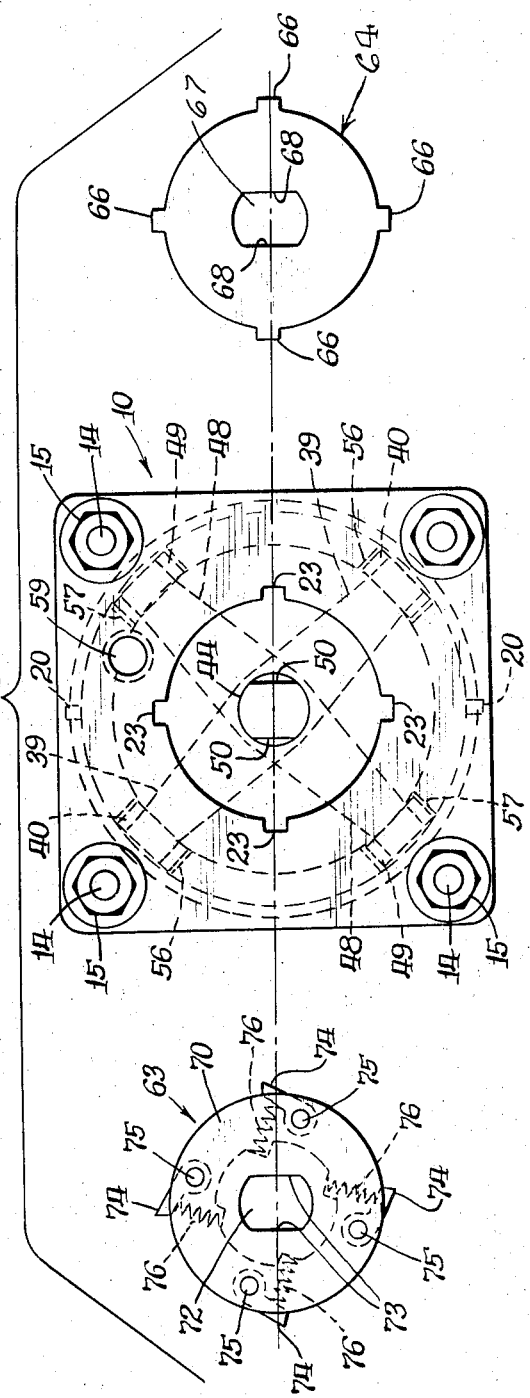

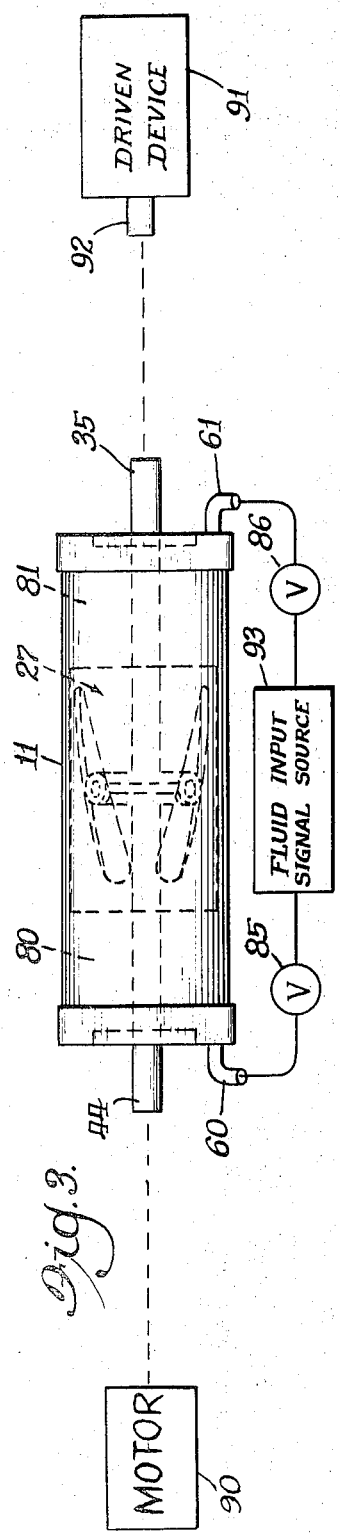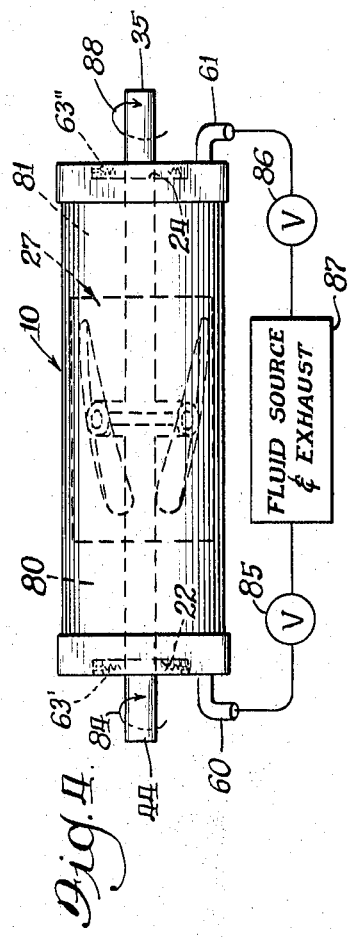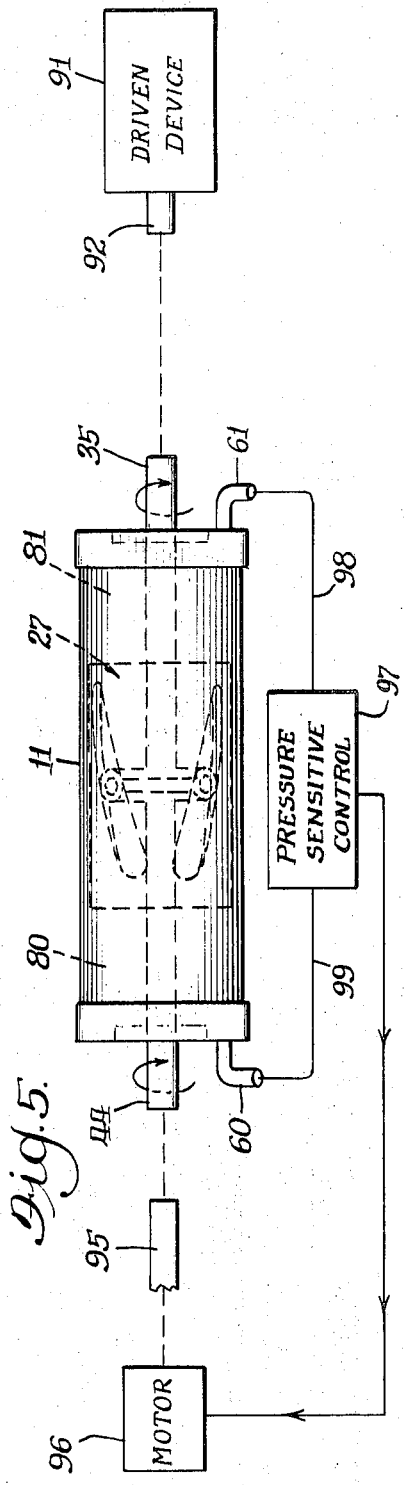

LINEAR TO ROTARY MOTOR

SUMMARY OF THE INVENTION

The present invention relates to a unique rotary apparatus having shafts at each end of a fluid cylinder within which is a piston cam connected to the shafts, which apparatus has a variety of applications.

DESCRIPTION OF THE DRAWINGS

FIG. 1 is a longitudinal section through an embodiment, with portions of the piston broken away;

FIG. 2 is an end view of the embodiment of FIG. 1 illustrating two shaft connectors which may alternatively be inserted into a cavity in the end of the embodiment; and FIGS. 3, 4 and 5 are diagrammatic illustrations of some of the various applications that may be made of the apparatus of the present invention.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The apparatus illustrated in the drawings comprises a fluid cylinder, generally 10. This cylinder is formed of a tubular steel barrel 11 and two ends or caps 12 and 13. The ends are pulled together and prevented from separating by four bolts 14 and nuts 15. The bolts extend through suitable openings in the ends 12 and 13.

Ends 12 and 13 have annular recesses 17 and 18, into which the respective ends of the barrel 11 project. At these points a fluid seal is obtained between the barrel and the respective end by O-rings 19 seated in a groove in the end. Projections 20 and 21 on the respective ends extend into these recesses and also into slots in the respective ends of barrel 11 so as to key the barrel to the ends and prevent relative rotation therebetween. At the external face of end 12 is a cavity 22 which is generally cylindrical, but with four projecting apertures 23 extending outwardly from the cylinder. A corresponding cavity 24 is in the outer face of end 13.

Within the cylinder 10 is a piston, generally 27. This piston has a head 28 with an annular skirt 29 integral therewith. An O-ring 30 is received in a groove in head 28 to provide a seal with the inner wall of the barrel 11. At the other end of the skirt 29 is a second head formed in part by cap 31 removably secured to the distal end of the skirt as by means of screws 32. In the illustrated embodiment the distal end of the skirt functions as a part of the piston head. It has a groove therein within which is an O-ring 33 to form a seal between the piston head and the inner wall of the barrel 11.

A shaft 35 extends through end 13 and is suitably journaled therein as by means of a bearing 36. An O-ring 37 forms a seal between the shaft and the end of the cylinder. This shaft extends through a cylindrical opening in the cap 31 of the piston. An O-ring 38 forms a seal at this point. At the inner end of shaft 35 are two radial arms 39, 180° apart and having cam followers 40 rotatably mounted at the distal ends thereof. The external portion of shaft 35 is generally cylindrical with two flats 41 on opposite sides thereof and defining irregularities in the otherwise circular periphery of the shaft.

Extending through end 12 of the cylinder is a shaft 44. In the end 12 it has a bearing 45 and an O-ring seal 46. This shaft extends through a cylindrical opening in head 28 of the piston at which point there is an O-ring seal 47. At the inner end of the shaft 44 are two radial arms 48, 180° apart and 90° from the arms 39 of shaft 35. At the distal ends of arms 48 are rotatable cam followers 49. Shaft 44 has flats 50, 180° apart at the external end thereof and defining irregularities in the otherwise circular periphery of the shaft.

The two shafts 35 and 44 are coaxial and have openings 51 and 52 in the inner ends thereof. A pin 53 is received in the openings 51 and 52 and rotatably interconnects the inner ends of the shafts. This pin has a spacer 54 thereon.

The skirt 29 of the piston has two slots 56 therein which define cam tracks for the cam followers 40. The skirt also has two slots 57 which define cam tracks for the cam followers 49. That is, the sides of the skirt at each slot are cams between which are received the respective cam follower. These cam tracks extend longitudinally of the cylinder 10 but are inclined with respect to the axis thereof. The tracks defined by slots 56 are inclined in a direction opposite to that of the tracks defined by slots 57.

End 12 has an opening 59 extending therethrough to provide fluid communication to the interior of the cylinder at that end. This opening is threaded to receive an appropriate conduit fitting 60. A corresponding opening extends through end 13 and is threaded to receive a fitting 61. Barrel 11 has an exhaust opening 62 at the longitudinal center thereof so as to prevent any buildup of fluid pressure between heads 28 and 31 of the piston.

Two types of inserts may alternatively be used in the end cavities 22. One insert is a ratchet, generally 63, and the other insert is a shaft lock, generally 64. Shaft lock 64 is an annular plate whose generally circular outside is just smaller than the circular outer wall of cavity 22 and has projections 66 to fit into the opening projections 23 of the cavity, thus locking the plate 64 against rotation with respect to the end into which it is inserted, that is 12 or 13. The shaft lock plate 64 has an inner opening 67 just large enough to slip over shaft 44 (or 35). It has flat sides 68 to fit along flats 50 or 41 of the two shafts and thus hold the shaft against rotation.

Ratchet 63 has a body 70 whose outer wall 71 is just smaller than the outer wall of cavity 22 and has an inner opening 72 just large enough to fit about shaft 44 or 35. Inner opening 72 has flat sides 73 to engage flats 50 or 41 on the shafts and thereby lock the body 70 rotationally to the shaft. Body 70 has an annular peripheral cavity within which are four dogs 74 pivotally mounted on pins 75. The dogs are urged outwardly by springs 76 in compression between body 70 and the dogs. When ratchet 63 is slipped into cavity 22 it will permit shaft 44 to rotate in a clockwise direction (as viewed in FIG. 2), but will prevent counterclockwise rotation of the shaft due to dogs 74 entering projections 23 and blocking a counterclockwise rotation. Of course, the ratchet can be turned over so that its other face will lie against the end of the cylinder. In that event it will permit counterclockwise rotation and prevent clockwise rotation.

As a starting point for describing the various uses to which this apparatus may be put, consider the relative movements of the shaft and the piston. For example, assume that chamber 80 (between end 12 and head 28) has fluid pressure (air, water, hydraulic fluid, etc.) applied thereto and chamber 81 communicates with exhaust; the piston 27 then will be moved to the right in FIG. 1 as indicated by the arrow 82. Assuming that the piston does not rotate in the barrel (being restrained by frictional forces) and that the load on shafts 35 and 44 is equal, shaft 35 will rotate in the direction indicated by arrow 83 (clockwise as viewed from its outer end) and shaft 44 will rotate in the direction indicated by arrow 84 (clockwise as viewed from its outer end). These two rotations are in opposite directions. They are, of course, caused by the cams in the skirt of the piston 27 engaging the cam followers which rotate the respective shaft. Should the piston 27 be moved to the left in FIG. 1 (the direction opposite that of arrow 82) the rotation of the two shafts 35 and 44 will be just the reverse of that illustrated by arrows 83 and 84.

FIG. 4 diagrammatically illustrates how the apparatus may be employed to alternatively rotate the two shafts 35 and 44. In this embodiment ratchets 63 have been inserted both in cavity 24 of end 13 and in cavity 22 of end 12. The ratchet 63' in end 12 is placed to permit clockwise rotation of shaft 44 (as viewed from its outside end) and ratchet 63'' in end 13 is placed to permit counterclockwise rotation of shaft 35 (as viewed from its outside end). Now with valves 85 and 86 open, the fluid source and exhaust 87 causes fluid under pressure to be applied to the left cavity 80 and the right cavity 81 to be exhausted. Again, the piston 27 will be moved to the right as indicated by arrow 82. The cam and cam follower apparatus connecting the piston with shaft 35 will tend to rotate shaft 35 in a clockwise direction as that shaft is viewed from the right hand end (direction 83 in FIG. 1). Such rotation will be blocked by the ratchet 63'', that ratchet holding the shaft 35 stationary. With shaft 35 stationary, the action of cams 56 and cam followers 40 will be to rotate piston 27 within barrel 11. This rotation will be in the same relative direction as indicated by the arrow 84. Shaft 44 can rotate in the direction indicated by arrow 84 because it is not blocked by the ratchet 63 in cavity 22. Therefore the rotation of the piston 27 will act to rotate shaft 44 in the direction indicated by arrow 84. At the same time, the movement of the piston in the direction indicated by arrow 82 results in an interengagement of cams 57 and cam followers 49, likewise causing shaft 44 to rotate in the direction indicated by arrow 84. Thus the end result will be that shaft 44 will rotate twice as much than it would have had shaft 35 not been blocked (assuming that the cams 56 and 57 are at equal inclinations with respect to the longitudinal axis of shafts 35 and 44).

If chamber 81 is pressurized and chamber 80 is exhausted, the piston 27 will be moved to the left (in a direction opposite to that of arrow 82). Now an action which is just the reverse of that described in the preceding paragraph will occur. That is, shaft 44 will be locked against rotation by the presence of the ratchet 63' in cavity 22. However, shaft 35 will be free to rotate in the direction indicated by arrow 88 (counterclockwise as shaft 35 is viewed from its external end). Note that when shafts 35 and 44 rotate, the direction of rotation is the same (i.e., compare movements 84 and 88).

Referring back to FIGS. 1 and 2, assume that the shaft lock 64 is inserted into cavity 22 at end 12. The effect of this will be to hold shaft 44 against rotation in either direction. Now if piston 27 is moved to the right, as indicated by arrow 82, shaft 35 will rotate in the direction indicated by arrow 83 an amount which is twice that which it would have rotated had not shaft 44 been locked. If piston 27 is moved to the left an equal distance, the shaft 35 is rotated in a direction opposite to that indicated by arrow 83 by an equal amount.

With shaft 44 similarly locked by plate 64, the apparatus may be employed as a torsional shock absorber. Thus, with air in cavities 80 and 81, the ports in the ends 12 and 13 are closed (i.e., a plug is inserted in threaded opening 59 and in the corresponding opening in end 13). Now, shaft 35 is suitably connected to the part whose movement is to be restricted. For example, an arm is secured to shaft 35 and a connecting rod extends between that part and the distal end of the arm. As the part moves it tends to rotate shaft 35. This tendency to rotate is resisted by the act of the piston 27 in compressing the air in cavity 80 or 81, as the case may be. Instead of closing the ports in the two ends 12 and 13, as by means of plugs, they may be connected to devices that will permit only a slow flow of fluid (as for example valves 85 and 86 which are only open a very small amount). This will provide a resistance to air flow and the compressed air behind that resistance device will permit only a slow movement of the piston 27.

Among other things, FIG. 3 illustrates how a disclosed apparatus can be employed as a shock absorbing coupling between a source of power such as motor 90 and a device to be driven 91. Assume that the driven device 91 involves mechanical operations which apply shock loads to the input shaft 92 thereof, but it is desired that these shock loads be at least reduced, if not eliminated, as applied to motor 90, since they might have a damaging effect upon the motor. In this event, the shaft 44 is coupled to motor 90 and the shaft 35 is coupled to the driven device 91. The two chambers 80 and 81 are filled with air (as by means of closing valves 85 and 86 to prevent any flow of air into or out of the chambers). In normal operation the rotation of shaft 44 caused by motor 90 will result in a corresponding rotation of shaft 92. But, when there is a shock load applied to shaft 35 from shaft 92, that shock load tends to move piston 27 in one longitudinal direction or the other depending upon the direction of the shock load. That movement of the piston is resiliently resisted by the compression of air in chamber 80 or chamber 81, as the case may be. This acts to absorb the shock load and at least reduce the extent to which it is transmitted to shaft 44 and motor 90. Again, valves 85 and 86 may be slightly open so as to permit additional excursions of piston 27, but yet offering resilient resistance to the movement of the piston.

FIG. 3 also illustrates how the apparatus may be employed as an integrator to provide an algebraic sum of mechanical input signals and fluid input signals. Thus, for example, assume that motor 90 is a stepping motor which periodically applies mechanical signals in the form of steps of rotation to shaft 44. These signals will sometimes be plus (clockwise) and sometimes minus (counterclockwise). Fluid input signals are obtained from a source 93 (e.g., hydraulic fluid or oil), valves 85 and 86 being open. At times these fluid signals are of one character, tending to move piston 27 one direction in the barrel and sometimes of the opposite character, tending to move piston 27 in the opposite direction in the barrel. The angular position of shaft 35 will represent the integral of these mechanical input signals and the fluid input signals. The driven device 91 connected thereto could be a readout apparatus to represent the algebraic sum as exhibited by the rotational position of shaft 35.

FIG. 5 illustrates a still further application. Here the shaft 95 is to have a predetermined phase position (without positive coupling) to shaft 92. Motor 96 may be speeded up or slowed down by a control 97 which is sensitive to the pressure of two inputs 98 and 99. Input 98 is connected to coupling 61 and input 99 is connected to coupling 60. Shaft 95 is connected to motor 96 and shaft 44 and shaft 35 is connected to shaft 92. Assume that the phase (angular position) of shaft 92 tends to change because of something that is occuring in the driven device 91. This change will cause the change in the angular position of shaft 35 as regard the angular position of shaft 44 resulting in a movement of the piston in its barrel and a corresponding pressurization of either chamber 80 or chamber 81 of the apparatus, depending on the direction of piston movement. The pressure change will, in turn, actuate the control 97 to cause motor 96 to speed up or slow down so as to restore shaft 44 to the same angular position that it initially had with respect to shaft 35 and thus return piston 27 to its original position in the barrel.

I claim:

1. A rotary apparatus comprising:
a fluid cylinder having two closed ends and a barrel extending therebetween and about an axis;
a first rotatable shaft extending through one of the ends with a first portion within the cylinder barrel and a second portion externally of the cylinder;
a second rotatable shaft extending through the other of the ends with a first portion thereof within the cylinder barrel and a second portion thereof externally of the cylinder;
a piston in said cylinder and movable in said cylinder barrel along said axis, said piston having skirt means;
first connecting means within said cylinder barrel including a first cam member and a first cam follower member engaging the cam member, one of said members being secured to said skirt and the other of the members secured to the first shaft; and
second connecting means within said cylinder barrel including a second cam member and a second cam follower member engaging the second cam member, one of said second members being secured to said skirt and the other of the second members secured to the second shaft;
said cam members being elongated and angularly disposed with respect to said axis, the angular disposition of one cam member being opposite to the angular disposition of the other cam member.

2. An apparatus as set forth in claim 1, wherein said shafts each extend along said axis approximately to the middle of said barrel, and including means rotatably connecting the shafts at the adjacent ends thereof.

3. An apparatus as set forth in claim 2, wherein said piston has two heads spaced from each other along said axis with said skirt extending between the heads, said cylinder having fluid connections communicating with the interior of the barrel at each end of the cylinder.

4. An apparatus as set forth in claim 3, wherein said skirt has two slots therein with the skirt at the sides of the slots defining said cam members, said cam follower members being in said slots, and including arms extending radially between the shafts and the follower members to secure them together.

5. An apparatus as set forth in claim 4, wherein there are two of said first cam follower members for the first shaft and positioned 180° apart about the first shaft, there are first cam members for each of the first cam follower members, there are two of said second cam follower members for the second shaft and positioned 180° apart about the second shaft, and there are second cam members for each of the second cam follower members.

6. An apparatus as set forth in claim 5, including ratchet means interconnecting the first shaft and one of the ends permitting said first shaft to rotate only in a given direction about said axis.

7. An apparatus as set forth in claim 6, including ratchet means interconnecting the second shaft and the other of the ends permitting said second shaft to rotate only in said given direction about said axis.

8. An apparatus as set forth in claim 1, wherein each of said ends has a fluid connection therein communicating with the interior of the barrel at the respective end of the cylinder, said ends each have an external face with a cavity therein generally cylindrical about the respective shaft, said cavity having a projection at one side of its generally cylindrical configuration, the second portions of said shafts being generally circular about said axis and having an irregularity therein lying within the respective cavity, and means at each end, positioned within the respective cavity and interengaging the respective end and the respective shaft.

9. An apparatus as set forth in claim 8, wherein said means at the one of the ends is a ratchet permitting the first shaft to rotate only in a given direction about said axis.

10. An apparatus as set forth in claim 9, wherein said means at the other of the ends is a ratchet permitting the second shaft to rotate only in said given direction about the axis.

11. An apparatus as set forth in claim 8, wherein said means at the one of the ends is a lock plate preventing rotation of the first shaft in either direction.

12. An apparatus as set forth in claim 1, wherein each end has an annular recess on the side thereof adjacent said barrel, the adjacent end of the barrel extending into the recess and said adjacent side of the end being within the barrel, an O-ring at each end between the end and the barrel and forming a seal therebetween, said barrel being a tubular sleeve, and means externally of the barrel holding the ends against movement away from each other.

13. An apparatus as set forth in claim 12, including engaging means between the respective ends and the ends of the barrel to prevent rotation between the same, said means externally of the barrel being a plurality of bolts at spaced positions about said axis and parallel thereto, said ends having openings through which said bolts extend.

14. An apparatus as set forth in claim 13, wherein said piston has two heads spaced from each other along said axis with said skirt extending between the heads.

15. An apparatus as set forth in claim 3, wherein one of said heads is releasably connected to said skirt.

16. An apparatus as set forth in claim 15, including a vent through said barrel midway between said ends.

17. An apparatus as set forth in claim 3, wherein said shafts respectively extend through said heads, and including O-rings between each head and the respective shaft.

18. A combination comprising the apparatus of claim 1 connected as a coupling between a driving means and a driven means.

19. A combination as set forth in claim 18 wherein said apparatus has fluid connections communicating with each end of said barrel, and including fluid source and exhaust means communicating with said connections.

* * * * *